(12) United States Patent
Ueno et al.

(10) Patent No.: US 12,511,082 B2
(45) Date of Patent: Dec. 30, 2025

(54) IMAGE FORMING DEVICE AND NON-TRANSITORY COMPUTER READABLE MEDIUM

(71) Applicant: FUJIFILM Business Innovation Corp., Tokyo (JP)

(72) Inventors: Kunikazu Ueno, Kanagawa (JP); Kohshiro Inomata, Kanagawa (JP); Kengo Tokuchi, Tokyo (JP); Takahiro Okayasu, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 421 days.

(21) Appl. No.: 17/968,135

(22) Filed: Oct. 18, 2022

(65) Prior Publication Data

US 2023/0333784 A1 Oct. 19, 2023

(30) Foreign Application Priority Data

Apr. 15, 2022 (JP) .................................. 2022-067433

(51) Int. Cl.
*G06F 3/12* (2006.01)
(52) U.S. Cl.
CPC .......... *G06F 3/1204* (2013.01); *G06F 3/1208* (2013.01); *G06F 3/1241* (2013.01); *G06F 3/1256* (2013.01)

(58) Field of Classification Search
None
See application file for complete search history.

(56) References Cited

U.S. PATENT DOCUMENTS

| | | | | |
|---|---|---|---|---|
| 6,313,924 B2* | 11/2001 | Kanamori | ............ | H04N 1/4078 358/1.9 |
| 7,773,888 B2* | 8/2010 | Katsumi | ............ | H04N 1/00344 399/10 |
| 8,970,868 B2* | 3/2015 | Asai | .................. | H04N 1/00347 358/1.15 |

FOREIGN PATENT DOCUMENTS

JP 6572797 B2 9/2019

* cited by examiner

*Primary Examiner* — Darryl V Dottin
(74) *Attorney, Agent, or Firm* — Oliff PLC

(57) ABSTRACT

An image forming device includes a processor configured to receive a correction from a user with respect to a process of printing a first document to be handled by the image forming device, and transmit correction information in a case where a predetermined condition is fulfilled, the predetermined condition indicating that a second document of which printing is to be handled by another image forming device is related to the first document, and the correction information causing the other image forming device to apply an effect of the correction to a process of printing the second document.

11 Claims, 13 Drawing Sheets

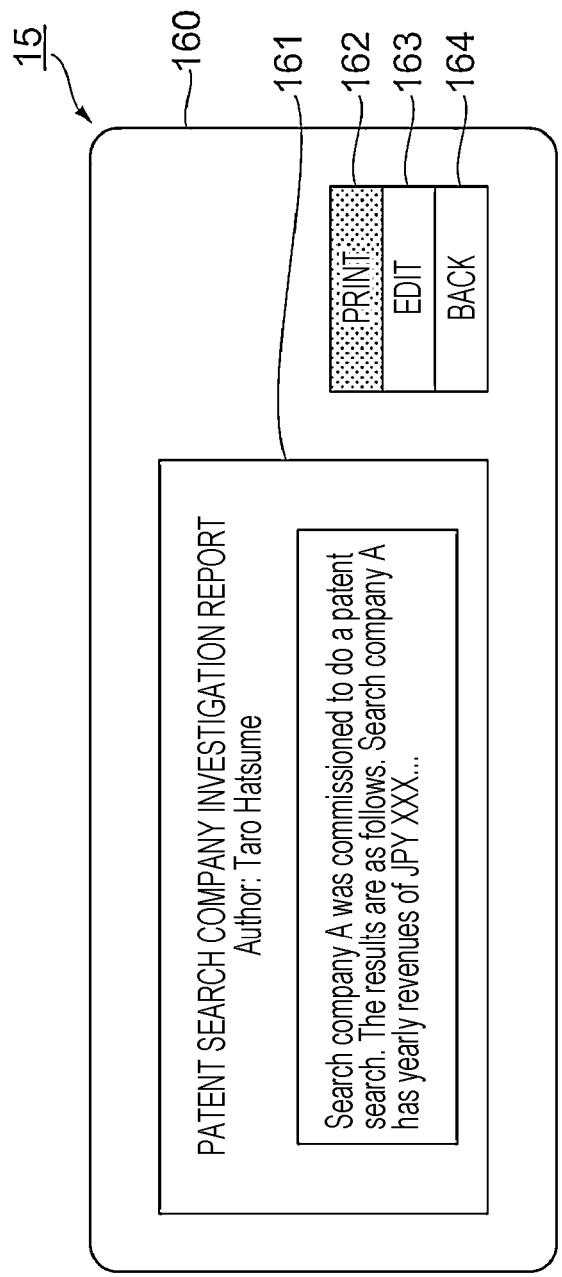

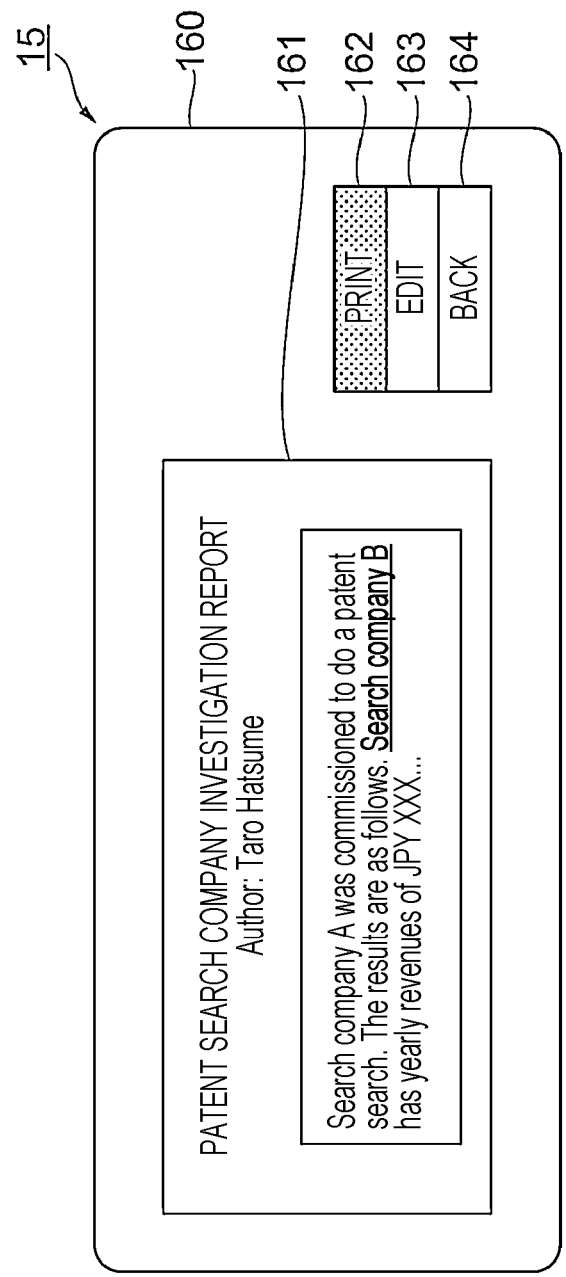

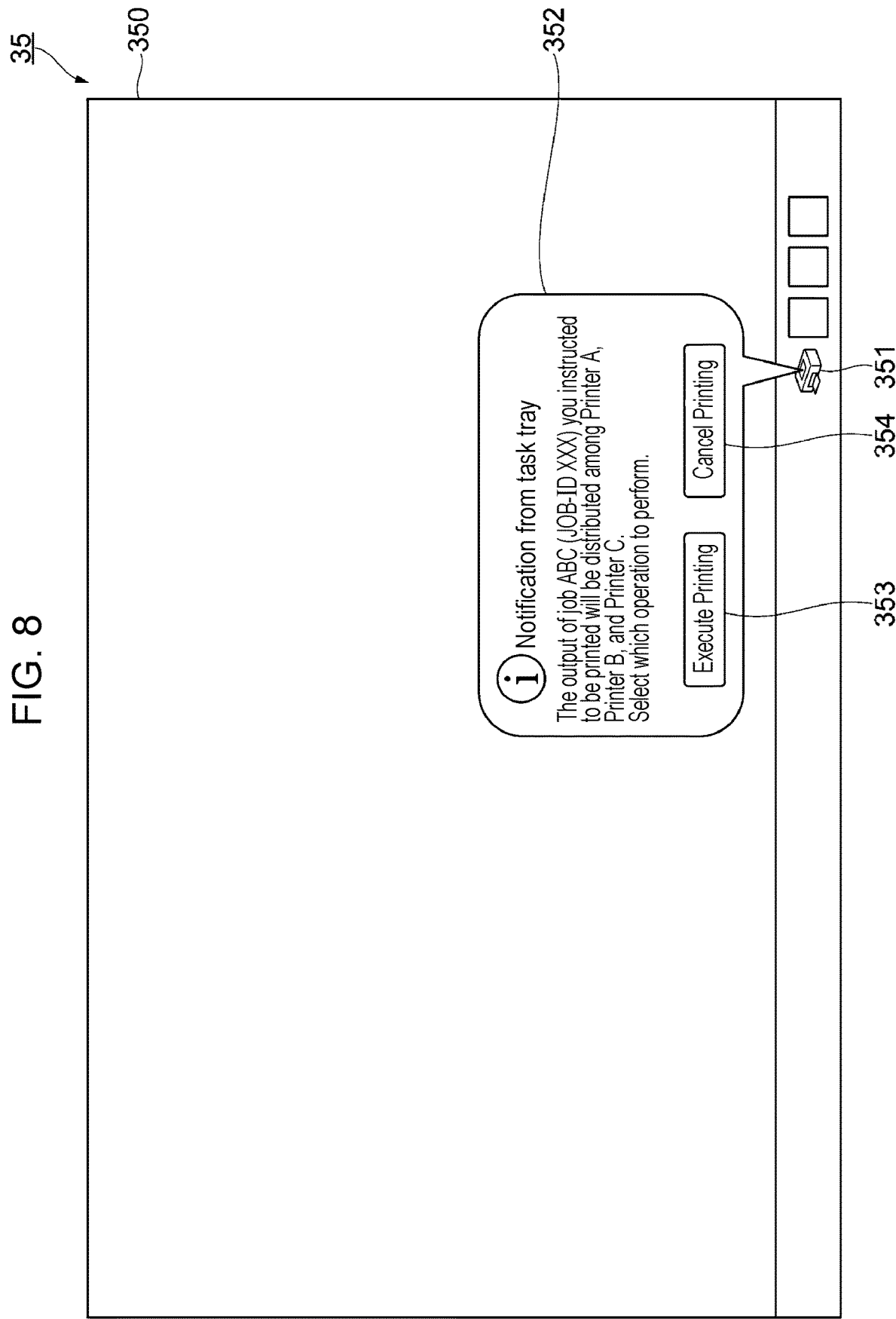

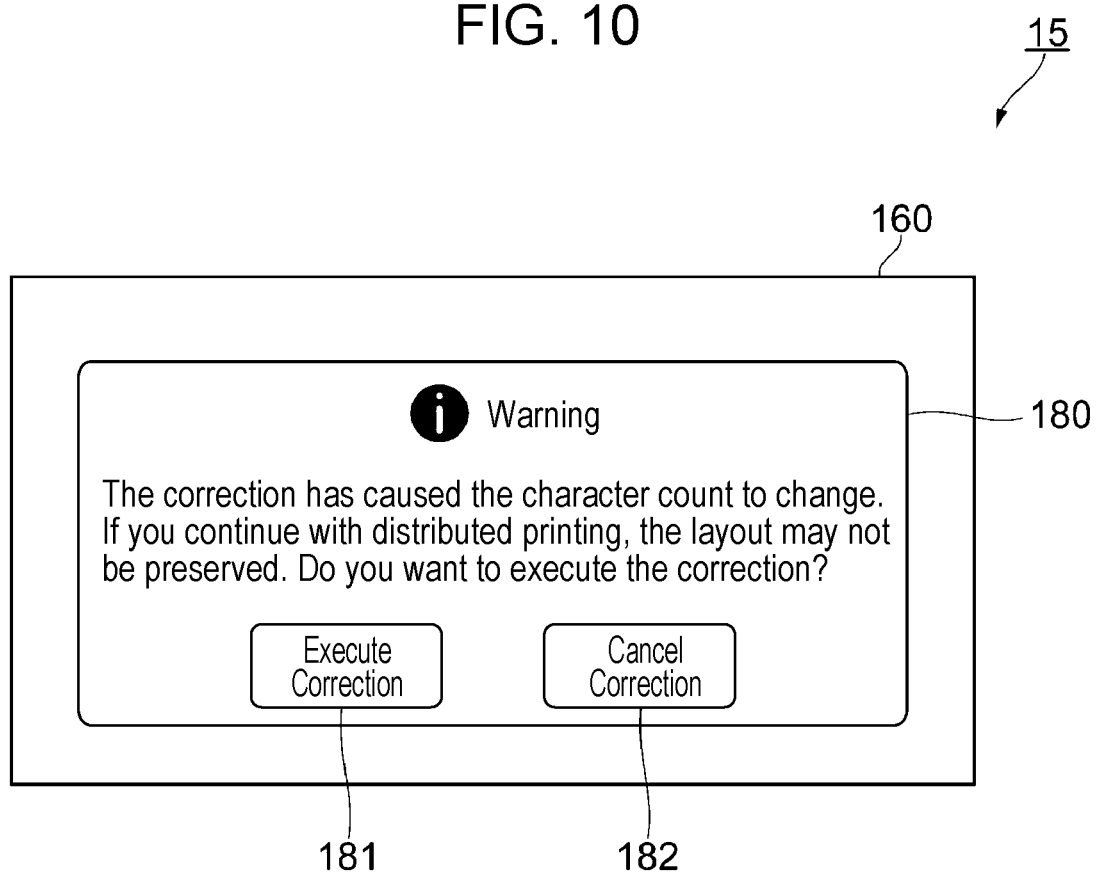

IMAGE FORMING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-067433 filed Apr. 15, 2022.

BACKGROUND

(i) Technical Field

The present disclosure relates to an image forming device and a non-transitory computer readable medium.

(ii) Related Art

Japanese Patent No. 6572797 discloses a server device that instructs a printing device to print first print data, in which if the server device receives correction data from a correction operation reception device integrated with the printing device, the server device updates the first print data on the basis of the correction data, calculates which pages need to be reprinted due to the update, and instructs the printing device to print second print data corresponding to the pages to be reprinted.

SUMMARY

The printing of documents may be distributed among multiple image forming devices in some cases. Additionally, if the user approaches one of the image forming devices after each image forming device is instructed to print, the user may discover a mistake related to the printing of the document handled by the approached image forming device. In this case, the user may need to correct the mistake and reissue an instruction for printing.

At this point, if the documents distributed to each of the image forming devices are related, and a correction is made with respect to the printing of the document handled by a certain image forming device, corrections may also need to be made with respect to the printing of the documents handled by the other image forming devices. However, making the correction for every image forming device is burdensome to the user.

Aspects of non-limiting embodiments of the present disclosure relate to reducing the user burden compared to the case of correcting a printing process on every image forming device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming device including a processor configured to receive a correction from a user with respect to a process of printing a first document to be handled by the image forming device, and transmit correction information in a case where a predetermined condition is fulfilled, the predetermined condition indicating that a second document of which printing is to be handled by another image forming device is related to the first document, and the correction information causing the other image forming device to apply an effect of the correction to a process of printing the second document.

BRIEF DESCRIPTION OF THE DRAWINGS

An exemplary embodiment of the present disclosure will be described in detail based on the following figures, wherein:

FIGS. 6A and 6B are diagrams illustrating examples of screens displayed on an image forming device, in which FIG. 6A illustrates a screen indicating a print job held in an image forming and another device, and FIG. 6B illustrates a screen including a preview image;

FIGS. 7A to 7C are diagrams illustrating examples of screen transitions pertaining to the correction of a character string in an image forming device, in which FIG. 7A illustrates a screen before the character string is corrected, FIG. 7B illustrates a screen when the correct character string is inputted, and FIG. 7C illustrates a screen after the correction is executed;

FIG. 8 is a diagram illustrating an example of a notification to a terminal device when an original document is split;

FIGS. 9A and 9B are diagrams for explaining a layout change in a case where a certain character string is corrected to a character string containing a different number of characters, in which FIG. 9A illustrates a preview image corresponding to a document before the character string is corrected and FIG. 9B illustrates a preview image corresponding to the document after the character string is corrected to a character string containing a different number of characters; and FIG. 10 is a diagram illustrating an example of a notification to a user in a case where a certain character string is corrected to a character string containing a different number of characters.

DETAILED DESCRIPTION

Hereinafter, an exemplary embodiment of the present disclosure (hereinafter referred to as "the present exemplary embodiment") will be described with reference to the attached drawings.

Information Processing System 1

Figure 1:
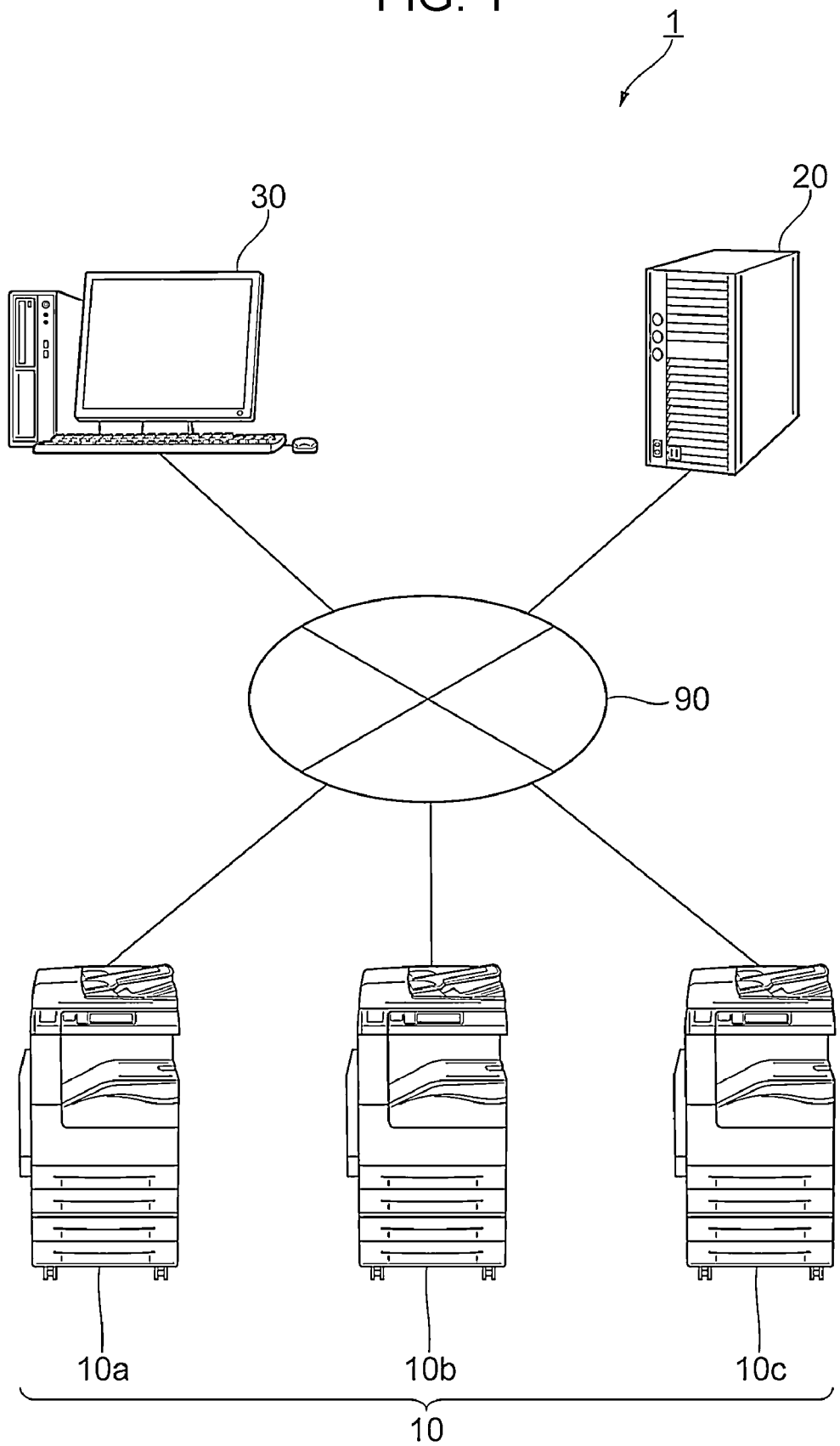
FIG. 1 is a diagram illustrating an overall configuration example of an information processing system according to an exemplary embodiment.

FIG. 1 is a diagram illustrating an overall configuration example of an information processing system according to an exemplary embodiment.

An information processing system 1 is provided with an image forming device 10 (10a, 10b, 10c) with a print function for forming an image onto a recording material on the basis of a print job, a terminal device 30 operated by a user of the image forming device 10, and a management server 20 that transmits a print job registered from the terminal device 30 to a designated image forming device 10.

In the information processing system 1, the image forming device 10, the terminal device 30, and the management server 20 are communicably interconnected through a network 90. The network 90 is not particularly limited insofar as the network may be used to communicate data among devices, and may be achieved by a local area network (LAN), a wide area network (WAN), the Internet, or a telephone line, for example. The network 90 may be wired, wireless, or a combination of the two. Furthermore, it may be configured such that a relay device such as a gateway device, a router, or an access point is used to connect each device through multiple networks and communication channels.

The image forming device 10 to which the present exemplary embodiment is applied execute a held print job. The image forming device 10 includes, as the print function, basic functions used to form an image onto a paper or another recording material.

Note that in the present exemplary embodiment, a print job refers to information including a data file of a document to be printed, print settings that govern the appearance of the printed material to be outputted by the printing, operating settings for configuring operating conditions and the like of the image forming device 10 that is to print the document, and information (a job ID/JOB-ID) for identifying the print job, the print job being information for instructing an image forming device 10 to perform a process of printing the document to be printed. Print settings are some kind of settings that govern the appearance of the printed material, and include a setting for printing multiple pages of the document together on the same recording material, a setting regarding the paper size in the case where paper is used as the recording material, a color/black and white setting, and a setting regarding the binding of the printed material, for example. A document is an electronic document and may include images in addition to characters (text), or images only without characters. A data file of a document may include information to be used when converting characters into images, the date and time when the electronic document was last modified, the paper size, the number of pages, and information such as keywords in the electronic document.

Also, the state in which the image forming device 10 holds a print job specifying a certain document for printing may also be referred to as "handling the printing of the document" in some cases.

Also, although described in detail later, the image forming device 10 includes a job correction function that allows a print job to be corrected in various ways.

Otherwise, the image forming device 10 may also include any of various types of communication functions, such as a function for connecting to the Internet through a wide area network (WAN) or a local area network (LAN), a function for connecting to a telephone network, and a function for connecting to another image forming device 10 without going through the terminal device 30, the management server 20, or the like, for example.

In the example in FIG. 1, three image forming devices 10 are disposed in the information processing system 1, but the number of image forming devices 10 is not limited.

The terminal device 30 according to the present exemplary embodiment is a terminal that transmits a print job to the image forming device 10 through the management server 20. In addition, each terminal device 30 is provided with a display (not illustrated) including a liquid crystal display (LCD) panel, an organic light-emitting diode (OLED) display panel, or the like that displays information such as images and text to a user.

The terminal device 30 is achieved by a computer apparatus, a tablet-type information terminal, a smartphone, or other kind of information processing device, for example.

Note that in the case of FIG. 1, one terminal device 30 is disposed in the information processing system 1, but multiple terminal devices 30 may also be disposed.

The management server 20 according to the present disclosure provides a function for transmitting to the image forming device 10 a print job that has been uploaded from the terminal device 30 and registered. Otherwise, the management server 20 may also provide a function for managing the content of a print job as a history after transmitting the print job to the image forming device 10, and a function for storing and managing a data file and information received from another device such as the image forming device 10.

The management server 20 is achieved by a server machine such as a computer apparatus, for example, but the number of server machines is not limited. Moreover, the functions of the management server 20 may also be achieved by being distributed among multiple virtual server machines in what is called a cloud environment, for example.

The following assumes a case where a user transmits a print job from the terminal device 30 to the image forming device 10, moves to the installation location of the image forming device 10 holding the print job, and individually gives an instruction for executing or stopping a print job.

Note that in the present exemplary embodiment, the image forming device 10 performs a user authentication process and allows an authenticated user to execute a registered print job.

An overview of the functions included in the image forming device 10 to which the present exemplary embodiment is applied will be given. First, each image forming device 10 holds a print job acquired from the user's terminal device 30 through the management server 20. Thereafter, in response to a user operation performed on one of the image forming devices 10, the print job held in the corresponding image forming device 10 is corrected. The image forming device 10 receiving the user operation then transmits correction information to another image forming device 10 holding a related print job, the correction information causing the effect of the correction to be applied to the print job held in each device.

Note that, as described above, a print job is information including a data file of a document, print settings, and operating settings, and in the present exemplary embodiment, the process of printing a document to be printed is corrected in accordance with a correction made to the corresponding print job. Also, a print job being "related" refers to the fulfillment of a predetermined condition indicating a relationship between a document to be printed in a certain print job and a document to be printed in another print job. Details about the predetermined condition will be described later.

By including the functions described above in the image forming device 10 according to the present exemplary embodiment, the effect of a correction made by the user to a print job held in one image forming device 10 is also applied to a print job held in another image forming device 10. With this arrangement, the user does not have to operate the individual image forming devices 10 to correct the print jobs individually. In this way, in the present exemplary embodiment, the user burden is reduced compared to the case of correcting a process for printing a document on every image forming device.

Image Forming Device 10

Figure 2:
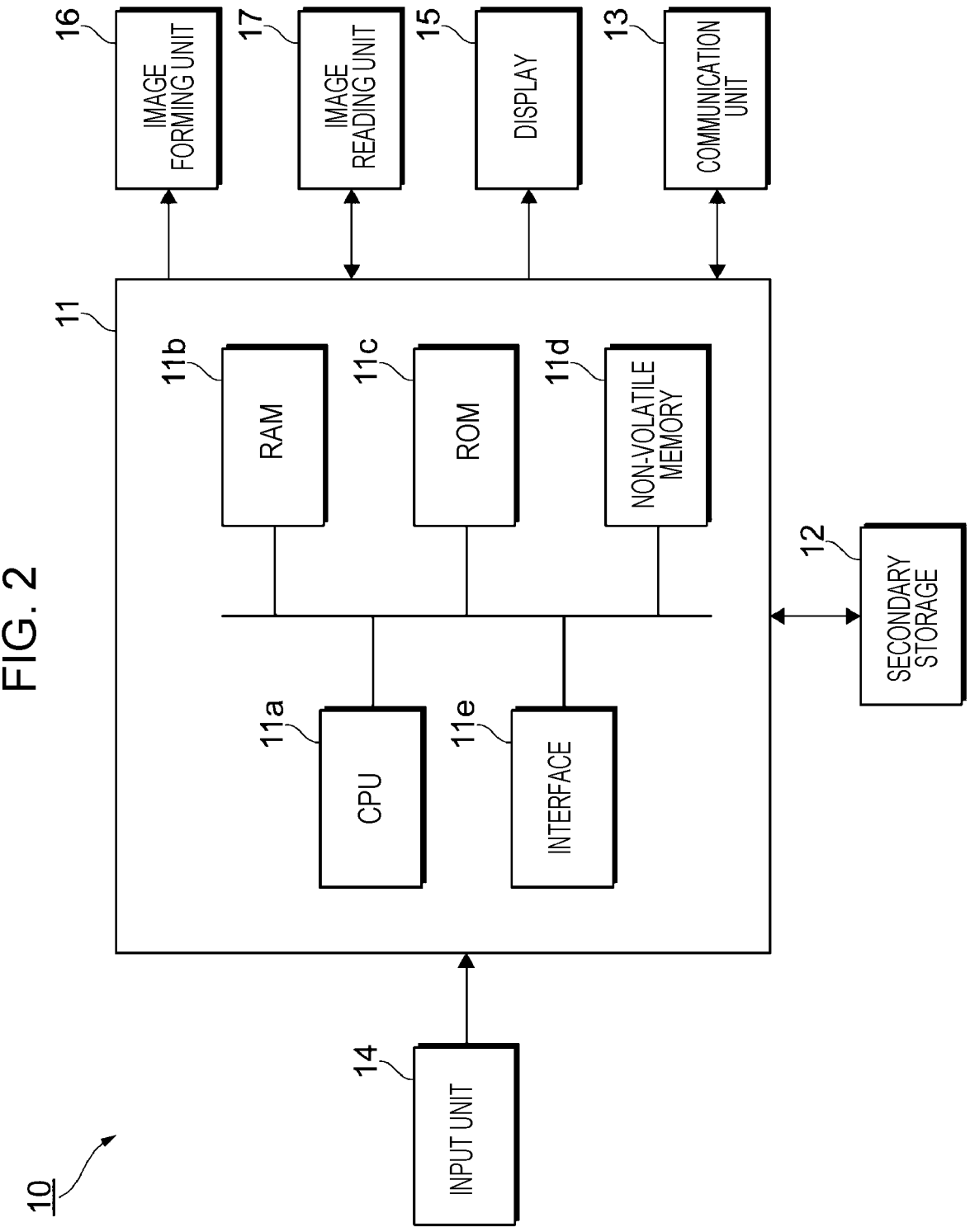
FIG. 2 is a diagram illustrating a hardware configuration of an image processing device to which the exemplary embodiment is applied.

FIG. 2 is a diagram illustrating an example of a hardware configuration of the image forming device 10 to which the present exemplary embodiment is applied. The image forming device 10 according to the present exemplary embodiment includes a computational processing unit 11 that executes digital computational processing in accordance with a predetermined program while in operation, a secondary storage 12 achieved with, for example, a hard disk drive (HDD) storing various data, and a communication unit 13 that transmits and receives information over the network 90 (see FIG. 1). The image forming device 10 also includes an input unit 14 such as keys, a touch panel, or a card reader that receives input operations from a user, a display 15 formed from a liquid crystal display (LCD) panel or an organic electro-luminescence (OLED) display panel that presents information such as images and text to the user, an image forming unit 16 that achieves the print function, and an image reading unit 17 that achieves a scan function.

The computational processing unit 11 is provided with a central processing unit (CPU) 11a as an example of a processor that controls the device as a whole, random access memory (RAM) 11b used as a working memory of the CPU 11a and the like, and read-only memory (ROM) 11c storing a program to be executed by the CPU 11a and the like. The computational processing unit 11 is also provided with non-volatile memory 11d which is rewritable and capable of retaining data even if the power supply is cut off, and an interface 11e that controls each unit such as the input unit 14 connected to the computational processing unit 11. The non-volatile memory 11d is configured as battery-backed SRAM or flash memory, for example. Also, in addition to storing various data and the like, the secondary storage 12 also stores programs to be executed by the computational processing unit 11. The processes of the image forming device 10 are executed by causing the computational processing unit 11 to load a program stored in the secondary storage 12.

The secondary storage 12 is configured by a non-volatile storage device such as a hard disk drive (HDD) or a semiconductor memory, for example. Information such as image data read by the image reading unit 17, fax data received via fax communication, and image data received through communication with external equipment is saved in the secondary storage 12. A portion of the image data received through communication with external equipment is a data file of a document included in a print job received through the management server 20. Otherwise, the secondary storage 12 stores a program to be executed by the computational processing unit 11, a print job, information about the user who registered the print job, and the like.

The image forming unit 16 is configured by a printer engine such as a laser printer or an inkjet printer, for example, forms an image onto a recording material such as paper according to an instruction from the computational processing unit 11, and outputs the formed image as printed material. The image forming unit 16 in the present exemplary embodiment achieves the print function by forming the content of print data onto paper and outputting the formed content as a paper document.

The image reading unit 17 includes an image scanner or the like, reads an image formed on a recording material such as paper according to an instruction from the computational processing unit 11, and outputs corresponding electronic data.

Figure 3:
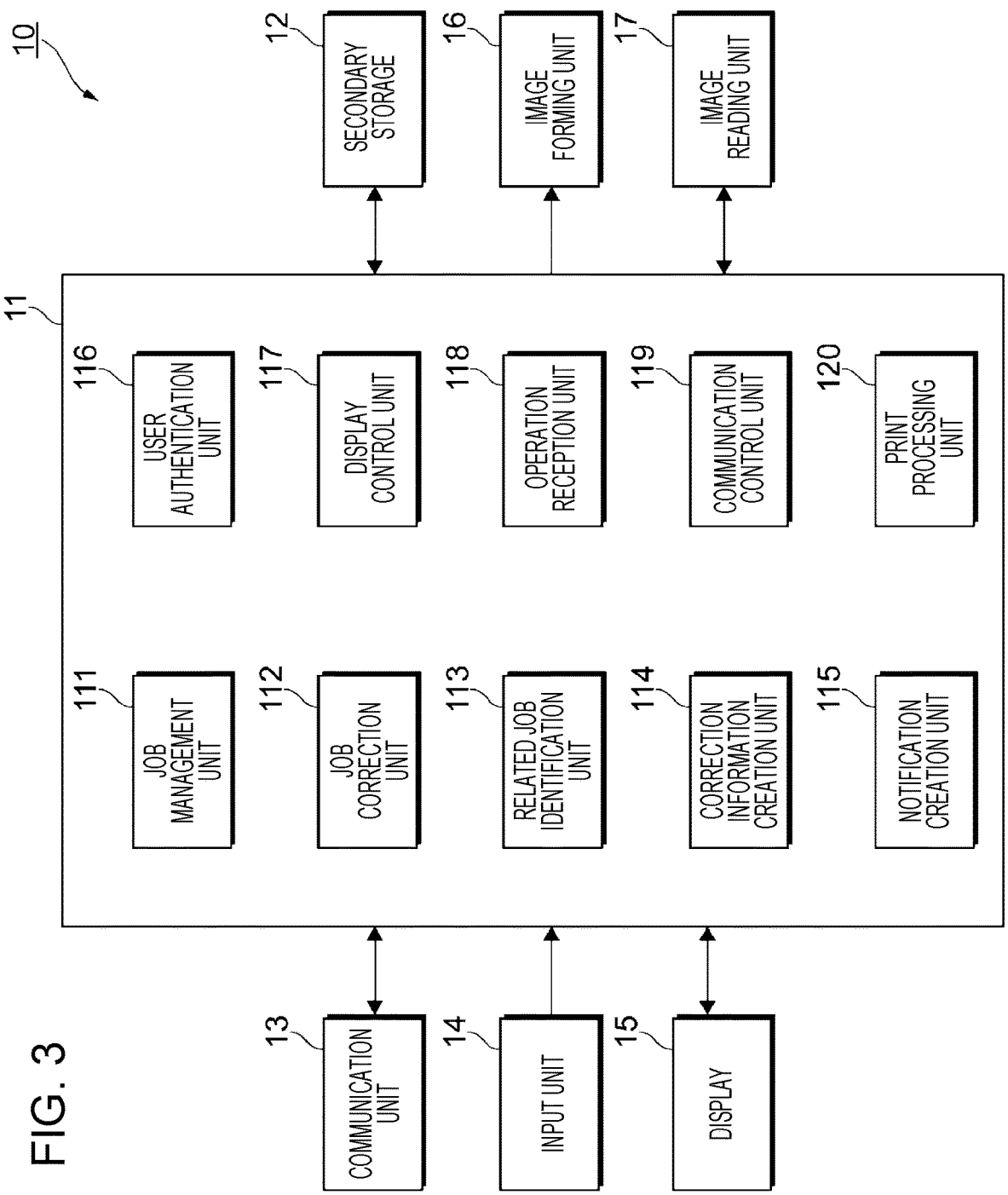
FIG. 3 is a diagram illustrating a functional configuration of an image processing device to which the exemplary embodiment is applied.

FIG. 3 is a diagram illustrating a functional configuration of the image forming device 10 according to the present exemplary embodiment. The computational processing unit 11 in the present exemplary embodiment includes a job management unit 111, a job correction unit 112, a related job identification unit 113, a correction information creation unit 114, a notification creation unit 115, a user authentication unit 116, a display control unit 117, an operation reception unit 118, and a communication control unit 119, and a print processing unit 120 as function units for achieving various functions.

Note that although the following mostly describes function units related to a print function and a job correction function, the image forming device 10 may also include other function units.

The job management unit 111 manages a print job received by the communication unit 13. The job management unit 111 according to the present exemplary embodiment stores and manages a received print job in the secondary storage 12, in association with information about the user who gave an instruction for registering the print job. Also, in the case where a print is executed and completed, the job management unit 111 deletes the print job.

Note that the job management unit 111 does not have to distinguish whether a print job is received through the management server 20 (see FIG. 1) or through another reception route. Examples of other reception routes include reception from the terminal device 30 (see FIG. 1) without going through the management server 20 and reception through another image forming device 10. In the present exemplary embodiment, the same processes are applied indiscriminately to received print jobs.

The job correction unit 112 corrects a print job held in the image forming on the basis of a correction instruction received by the operation reception unit 118. Correcting a print job involves correcting the content of the document to be printed or correcting a print setting, for example.

More specifically, the job correction unit 112 according to the present exemplary embodiment is a function unit including a function for editing a document, and executes processes such as removing a character string or image included in the document and adding a new character string or image, on the basis of a user operation. The job correction unit 112 is also a function unit including a function for changing print settings, and executes processes for changing the appearance of the paper document to be outputted, such as changing the paper size and the binding method, for example.

In addition, the job correction unit 112 according to the present exemplary embodiment applies the effect of a correction made by another image forming device 10 to a print job held in the image forming according to correction information received from the other image forming device 10.

The related job identification unit 113 identifies a print job (also referred to as a "related job" in some cases) related to a print job held in the image forming from among print jobs held in another image forming device 10.

More specifically, the related job identification unit 113 acquires other device job information, which is information about print jobs held in another image forming device 10. On the basis of the acquired other device job information, the related job identification unit 113 determines whether a document to be handled by a print job held in another image forming device 10 fulfills a predetermined condition indicating a relationship with a document to be handled by a print job held in the image forming. If the predetermined condition is fulfilled, the related job identification unit 113 identifies the print job held in the other image forming device 10 as a related job. In this case, the document to be handled by a print job held in the image forming is an example of a first document, and the document to be handled by a print job held in the other image forming device 10 is an example of a second document.

Thereafter, if a correction is received with respect to a print job held in the image forming, the related job identification unit 113 identifies the other image forming device 10 holding the related job as a destination of correction information.

The identification of a print job in the present exemplary embodiment will be described in further detail. The following describes an example of a case where a print job A for handling a document "Report A" is held in an image forming device 10*a* operated by the user, and a print job B for handling a document "Report B" held in another image forming device 10*b* is identified as a related job. Note that when referring to a document " ", the content inside the parentheses corresponds to the name of the document.

Since the print job B was registered by the same user as the print job A and the names of the documents contain a shared character string, the related job identification unit 113 according to the present exemplary embodiment determines that Report B is a document related to Report A, and identifies the print job B as a related job of the print job A. More specifically, the related job identification unit 113 acquires other device job information, including the name of the document to be handled and identification information of the user who registered the print job, pertaining to print jobs held in another image forming device 10. Next, since the acquired other device job information indicates that, from among the print jobs held in another image forming device 10, the print job B was registered by the same user as the print job A and the names of the documents Report A and Report B contain the same character string "Report", the related job identification unit 113 determines that Report B is a document related to Report A and identifies the print job B as a related job.

Here, "the print job was registered by the same user" and "the names of the documents contain a shared character string" are examples of the predetermined condition indicating a relationship between documents. Also, "the names of the documents contain a shared character string" is an example of including shared matter.

Note that the other device job information is information about print jobs and may include information relevant to determining the condition indicating a relationship between documents. In the present exemplary embodiment, since "the print job was registered by the same user" and "the names of the documents contain a shared character string" are treated as the conditions, other device job information including the identification information of the user who registered the print job and the name of the document to be handled by the print job is acquired. The other device job information is acquired by requesting the management server 20, for example. As another example, the other device job information is acquired by requesting the other image forming device 10.

The correction information creation unit 114 creates correction information according to the correction of a print job held in the image forming. The correction information may include information for applying the effect of the correction received by the image forming to a print job held in another image forming device 10. In other words, the other image forming device 10 may be capable of applying the effect of the correction according to the correction information.

The following describes correction information more specifically by taking the example of a case where a print job A for handling a document "Report A" is held in an image forming device 10*a* operated by the user, and a print job B for handling a document "Report B" is held in another image forming device 10*b*. Note that it is assumed that the print job B has been identified as a related job of the print job A. The document "Report A" is an example of a first document, and the document "Report B" is an example of a second document.

For example, in some cases, the document "Report A" and the document "Report B" may have the same typographical error in the content of the document. In such cases, if the typographical error included in the document "Record A" is corrected on the image forming device 10*a*, a similar correction of the typographical error included in the document "Record B" on the image forming device 10*b* is desirable as an effect of the correction. In other words, as an effect of the correction of the typographical error in the document "Report A", it is desirable to apply a similar typographical correction to the document "Report B". In this example, the correction information transmitted from the image forming device 10*a* to the image forming device 10*b* includes information for replacing a character string containing a typographical error with a correct character string, being at least information about the uncorrected character string and the corrected character string. Similar correction information may also be used not for a typographical error, but rather when simply replacing a shared character string or image included in both documents "Report A" and "Report B" with another character string or image.

In this way, in the present exemplary embodiment, in a case where, for shared matter included in both documents "Report A" and "Report B", at least a portion of the shared matter included in the document "Report A" is replaced and corrected, correction information for replacing the shared matter included in the document "Report B" with other matter is transmitted.

As another example, in some cases, it may be desirable to standardize the appearance of paper documents outputted in the print job A and the print job B. In this case, if a print setting of the print job A is corrected on the image forming device 10*a*, a similar correction of the print setting of the print job B on the image forming device 10*a* is desirable as an effect of the correction. In other words, as an effect of the correction of the print setting of the print job A, it is desirable to apply a similar correction of the print setting of the print job B. In this example, the correction information transmitted from the image forming device 10*a* to the image forming device 10*b* includes at least the corrected print setting.

In this way, in the present exemplary embodiment, if an instruction is received for outputting a paper document to be outputted by the print job A with a different appearance, that is, if a correction of a print setting is received, correction information for causing the paper document to be outputted by the print job B with a different appearance, that is, for similarly correcting the print setting of the print job B, is transmitted.

The notification creation unit 115 creates information with which to notify another device such as another image forming device 10 or the terminal device 30. More specifically, the notification creation unit 115 according to the present exemplary embodiment creates information with which to notify another device according to a user instruction received by the operation reception unit 118 or according to various processes performed on the image forming.

The user authentication unit 116 executes an authentication process for specifying a user attempting to operate the image forming. For example, the user authentication unit 116 acquires information for identifying the user from user information, an IC card, a part of the user's body, a terminal carried by the user, or the like, and executes an authentication process. As another example, the user authentication unit 116 may acquire an ID and a password on the basis of an operated performed by the user through the input unit 14, and execute an authentication process.

Note that although the above describes cases where the image forming device 10 performs user authentication on its own, the image forming device 10 may also perform user authentication by requesting authentication by a device such as an external authentication server, and receiving an authentication result, for example.

The display control unit 117 controls not only the type and content of images, various icons, text, and the like to be displayed on the display 15, but also the display appearance such as the position and size of images to be displayed and the like.

For example, the display control unit 117 controls the display of a list of print jobs held in the image forming as a screen for receiving an instruction for executing a print job from the user. The display control unit 117 also controls the display of a list of print jobs held in another image forming device 10 acquired as other device job information, and a list of related jobs identified by the related job identification unit 113. Furthermore, when correcting a print job, the display control unit 117 controls the display of a screen for receiving a correction. One example of a screen for receiving a correction is a screen 160 to be described later using FIGS. 7A to 7C.

The operation reception unit 118 receives a user instruction according to an operation performed by the user through the input unit 14. A user instruction refers to an instruction for correcting a print job, for example, and is an instruction for correcting the content of a document or for correcting a print setting. A user instruction may also be an instruction for displaying an image indicating the content of a document corresponding to a registered print job or an image indicating the content of a document corresponding to a corrected print job. Furthermore, a user instruction may also be an instruction for executing a held print job or an instruction for stopping a print job being executed.

The communication control unit 119 controls the transmission and reception of information with other devices through the communication unit 13. For example, the communication control unit 119 receives various information such as a print job transmitted from the terminal device 30, correction information transmitted from another image forming device 10, and other device job information transmitted from another image forming device 10 or the management server 20.

As another example, the communication control unit 119 transmits various information to other devices. Specifically, the communication control unit 119 not only transmits correction information created by the correction information creation unit 114 to another image forming device 10, but also transmits a notification created by the notification creation unit 115 to another image forming device 10 or the terminal device 30. The communication control unit 119 also transmits information indicating the content of a process executed on the image forming, information transmitted to another image forming device 10 or the terminal device 30, and the like to the management server 20 to cause the information to be managed as a history. Furthermore, the communication control unit 119 transmits an indication that the execution of a print job has been completed to the management server 20 for management.

Otherwise, the communication control unit 119 transmits various instructions to other devices.

The print processing unit 120 reads out and executes a print job from the secondary storage 12. More specifically, the print processing unit 120 reads out and executes a print job on the basis of the user performing an instruction operation for executing a print job or on the basis of receiving an instruction for executing a print job from another image forming device 10. Specifically, the print processing unit 120 reads out the print job designated for execution from the secondary storage 12 and controls the image forming unit 16 to execute printing.

The print processing unit 120 also aborts a print job being executed, in response to a stop instruction received by the operation reception unit 118. Furthermore, the print processing unit 120 also aborts a print job being executed in the case where a correction is made by the job correction unit 112.

[Management Server 20 and Terminal Device 30]

Figure 4:
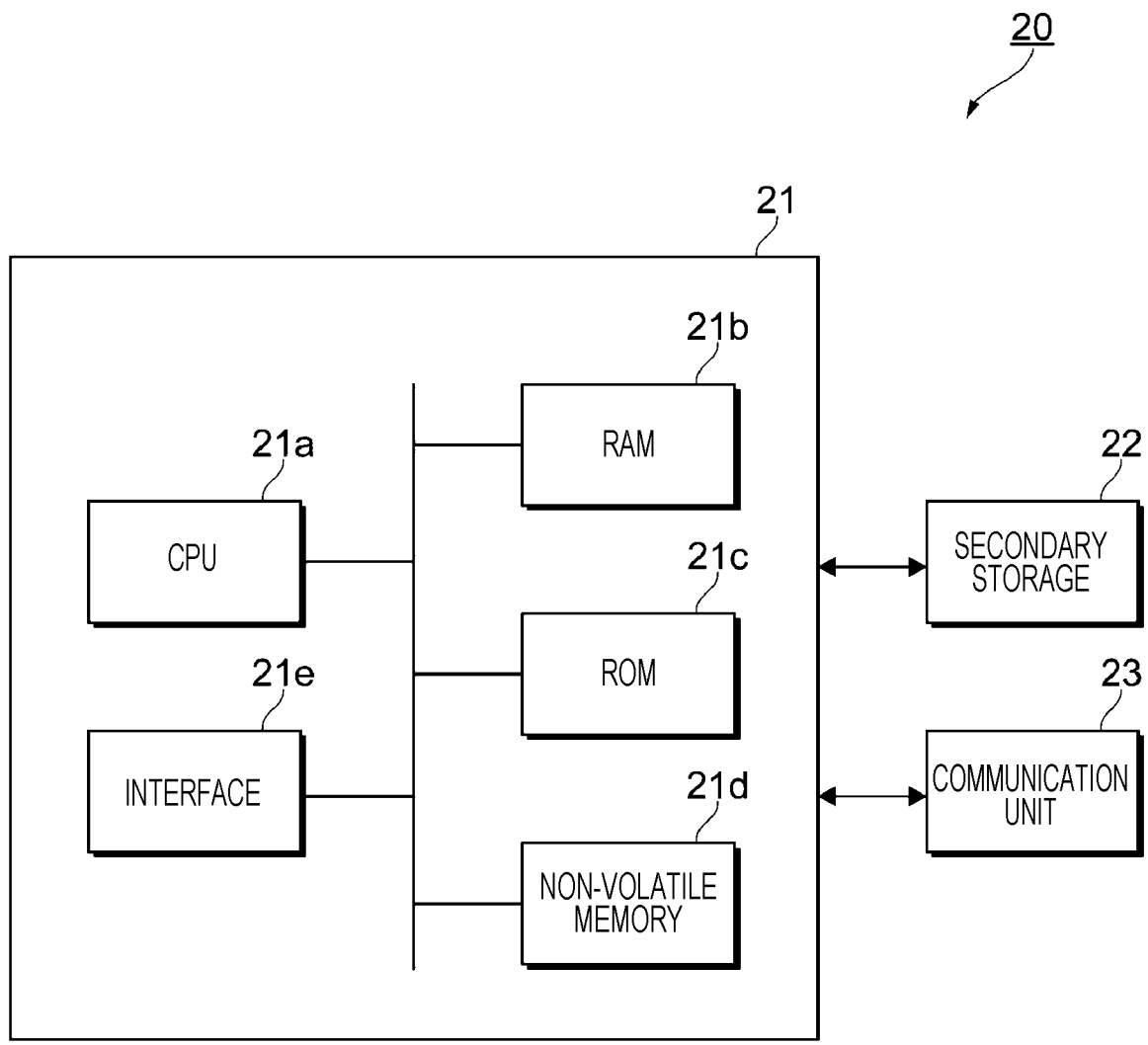
FIG. 4 is a diagram illustrating a configuration example of a management server according to the exemplary embodiment.

FIG. 4 is a diagram illustrating a configuration example of the management server 20 according to the present exemplary embodiment.

The management server 20 according to the present exemplary embodiment includes a computational processing unit 21 that controls operations by the device as a whole, a secondary storage 22 storing various information such as print jobs, and a communication unit 23 that transmits and receives information through a communication channel.

The computational processing unit 21 is provided with a CPU 21a as an example of a processor that controls the device as a whole, RAM 21b used as a working memory of the CPU 21a and the like, and ROM 21c storing a program to be executed by the CPU 21a and the like. In addition, the computational processing unit 21 is provided with non-volatile memory 21d which is rewritable and capable of retaining data even if the power supply is cut off, and an interface 21e that controls each unit such as the communication unit 23 connected to the computational processing unit 21.

The non-volatile memory 21d is configured using battery-backed SRAM or flash memory, for example, and stores data files of documents, settings information, and the like. The processes of the management server 20 are executed by causing the computational processing unit 21 to load a program stored in the secondary storage 22.

The secondary storage 22 is configured by a hard disk drive (HDD) or a semiconductor memory, for example. The secondary storage 22 stores a program to be executed by the computational processing unit 21, a print job, and user information, for example.

The management server 20 not only receives and manages print jobs and related information from the terminal device 30, but also receives and manages, as a history, information indicating the content of executed processes and the like from each image forming device 10. The management server 20 also transmits and provides various information such as a print job and related information to the image forming device 10.

Furthermore, the management server 20 according to the present exemplary embodiment receives information from each image forming device 10 indicating that a print job has been executed and completed. With this arrangement, the status of a print job transmitted to each image forming device 10 is managed as being in progress, not started, or finished.

The hardware configuration of the terminal device 30 according to the present exemplary embodiment is similar to the hardware configuration of the management server 20 described above, besides being provided with an input unit such as a keyboard or mouse that receives the input of a user operation and a display configured as an LCD panel or the like. Accordingly, a detailed description and drawing are omitted.

The terminal device 30 receives a user instruction on the basis of a user operation inputted through the input unit. A user instruction refers to an instruction for designating a document stored in the terminal device 30 and an instruction for printing a designated document, for example.

The terminal device 30 also generates a print job for a document that the user has designated for printing.

Thereafter, the terminal device 30 transmits the generated print job to a designated destination. In the case of the present exemplary embodiment, the final destination of a generated print job is taken to be the image forming device 10 (see FIG. 1). For example, the terminal device 30 transmits a print job to the image forming device 10 through the management server 20 (see FIG. 1). Otherwise, the terminal device 30 may transmit a print job to the image forming device 10 without going through the management server 20. However, in the present exemplary embodiment, by causing a print job to be transmitted through the management server 20, a history of print jobs is managed by the management server 20.

The terminal device 30 may also acquire various information such as a notification transmitted by the communication control unit 119 of the image forming device 10 and display the acquired information on a display.

[Operations by Each Device]

Next, operations by each device in relation to print job registration and document correction will be described using FIGS. 5 to 7C.

Figure 5:
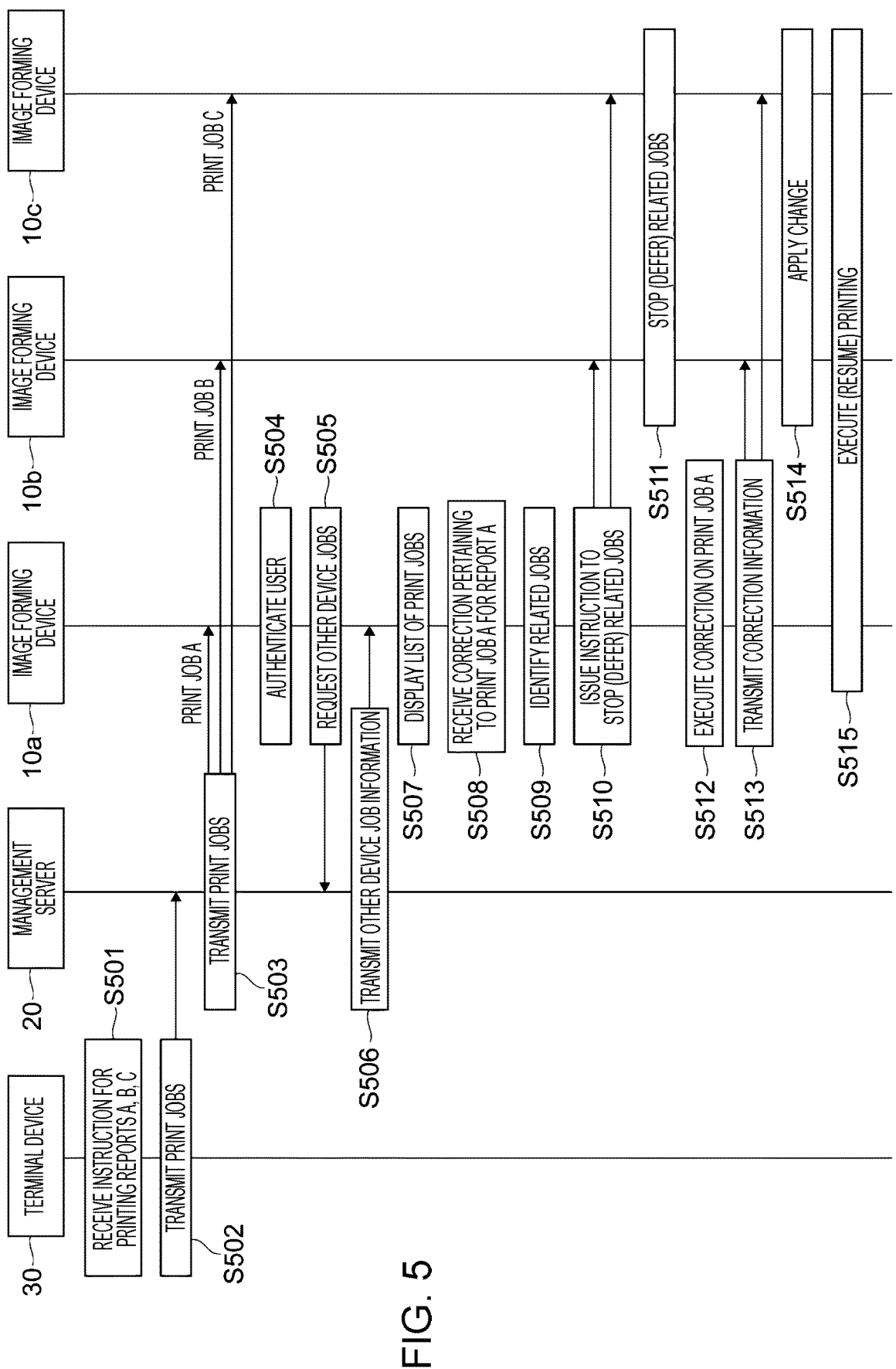
FIG. 5 is a sequence diagram illustrating an example of operations by each device in the exemplary embodiment.

FIG. 5 is a sequence diagram illustrating an example of operations by each device in the exemplary embodiment.

Figure 6A:
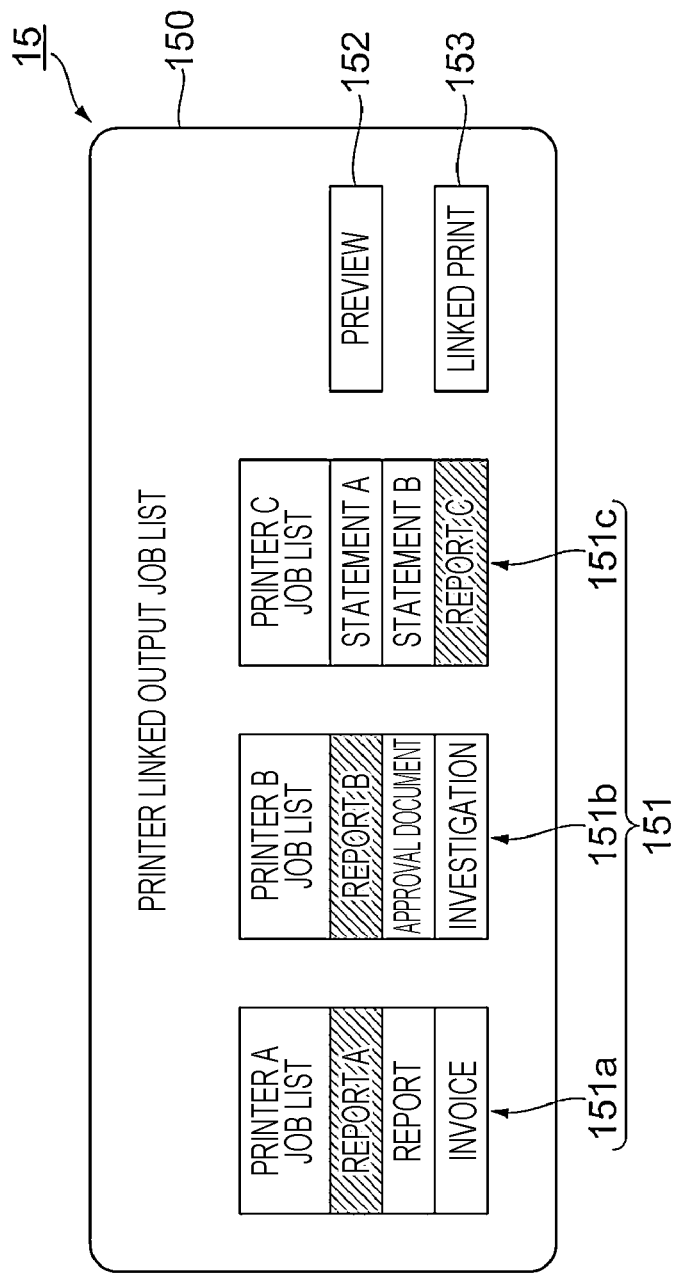

FIGS. 6A and 6B are diagrams illustrating examples of screens displayed on the image forming device 10a, in which FIG. 6A illustrates a screen 150 indicating a print job held in an image forming and another device, and FIG. 6B illustrates a screen 160 including a preview image 161.

Figure 7A:
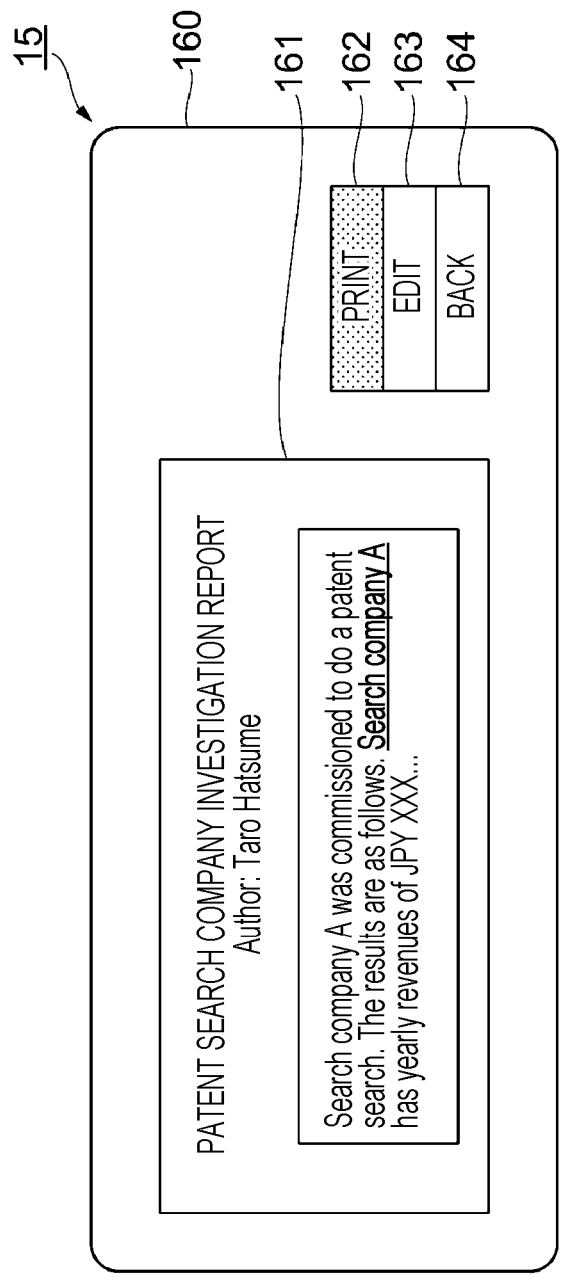
Figure 7B:
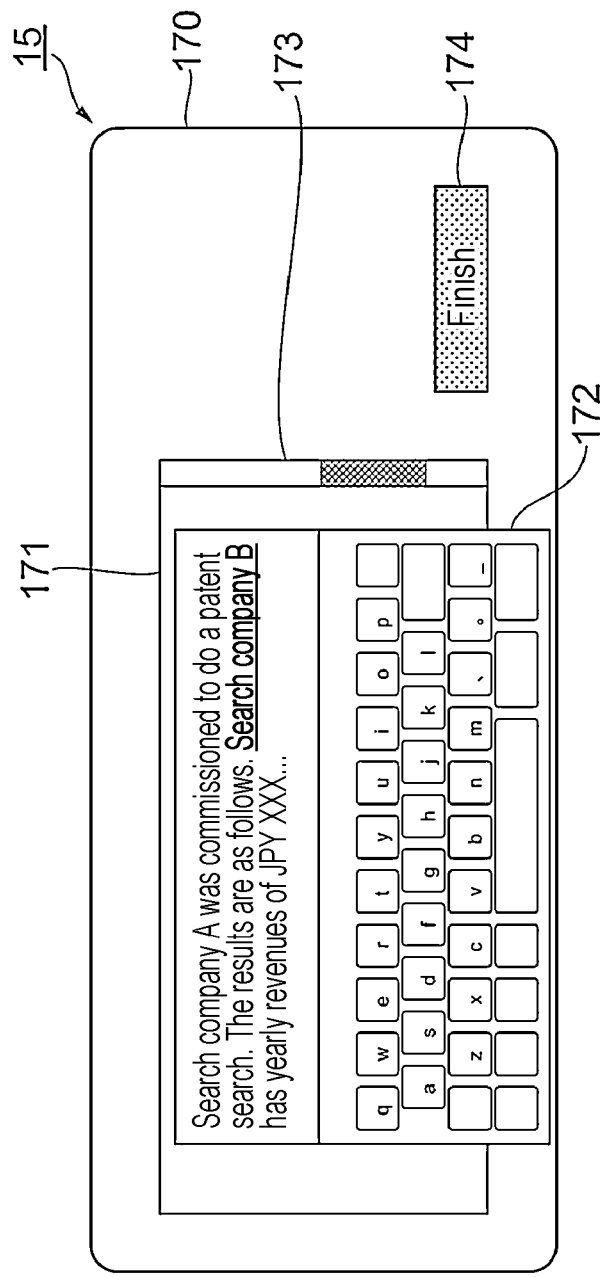

FIGS. 7A to 7C are diagrams illustrating examples of screen transitions pertaining to the correction of a character string in an image forming device, in which FIG. 7A illustrates a screen 160 before the character string is corrected, FIG. 7B illustrates a screen 170 when the correct character string is inputted, and FIG. 7C illustrates a screen 160 after the correction is executed.

The follow describes an example of a case where, for interrelated documents "Report A", "Report B", and "Report C", an image forming device 10a holds a print job A for handling the document "Report A", an image forming device 10b holds a print job B for handling the document "Report C", and an image forming device 10c holds a print job C for handling the document "Report C".

Note that in the diagrams, the document "Report A" is simply designated Report A. Similarly, the other documents are also designated by name only.

In addition, the image forming devices 10a, 10b, and 10c may be referred to as "Printer A", "Printer B", and "Printer C", respectively, as names for distinguishing the image forming devices.

First, the terminal device 30 receives an instruction for printing multiple documents from the user (S501). In this example, an instruction for printing the three documents "Report A", "Report B", and "Report C" is received from a certain single user.

Next, the terminal device 30 transmits the print job A, the print job B, and the print job C generated for each of the documents to the management server 20 (S502).

Next, the management server 20 transmits the received print jobs to the image forming devices 10 responsible for printing (S503). In this example, the management server 20 transmits the print job A for handling the document "Report A" to the image forming device 10a, the print job B for handling the document "Report B" to the image forming device 10b, and the print job C for handling the document "Report C" to the image forming device 10c.

Each image forming device 10 holds the received print job.

Note that which print job is transmitted to each image forming device 10 may be determined on the basis of a user instruction. For example, when an instruction for printing the documents "Report A", "Report B", and "Report C" is received on the terminal device 30, the destinations of the print jobs may be determined according to the reception of an instruction indicating that the document "Report A" is to be handled by the image forming device 10a, the document "Report B" is to be handled by the image forming device 10b, and the document "Report C" is to be handled by the image forming device 10c.

As another example, the management server 20 may also determine the destinations of the print jobs automatically. More specifically, the management server 20 may assign priority to all of the image forming devices 10 belonging to the information processing system 1, and determine the destinations of the print jobs by priority. Note that the priority may be predetermined or may be determined in accordance with factors such as the processing power of the image forming devices 10 and the number of print jobs being held in an in-progress or not-started state.

At this point, the user who was operating the terminal device 30 moves to the installation location of the image forming device 10a and operates the image forming device 10a.

The image forming device 10a executes a process for authenticating the user operating the device itself (S504). The image forming device 10a authenticates the user operating the device itself on the basis of information inputted by the user. In other words, the image forming device 10a specifies the authenticated user as the user operating the device itself.

Next, the image forming device 10a requests other device job information from the management server 20 (S505). In the present exemplary embodiment, other device job information, including identification information of the user who registered each print job and the name of the document to be handled by each print job, is requested for all print jobs being held in other the image forming devices 10.

The management server 20 transmits the requested other device job information to the image forming device 10a (S506).

Note that in another exemplary embodiment, the other device job information may also be requested and acquired from the other image forming devices 10.

In the present exemplary embodiment, the image forming device 10a may receive, from the user, the selection of a mode (hereinafter referred to as the "linked output mode") in which information about the print jobs held in the other image forming devices 10 is also displayed. If the selection of the linked output mode is received, the image forming device 10a displays a list of the print jobs held in the device itself and the other image forming devices 10 (S507). Note that in the present exemplary embodiment, the list of print jobs is displayed on the basis of the other device job information acquired from the management server 20. In another exemplary embodiment, the information for displaying the list of print jobs may also be acquired as information different from the other device job information.

In the present exemplary embodiment, the screen 150 illustrated in FIG. 6A is displayed as the list of print jobs on the image forming device 10a. The screen 150 is provided with job lists 151 (151a, 151b, and 151c) listing the print jobs held in each image forming device 10, a "Preview" button 152 operated to give an instruction for displaying an image illustrating the content of a document, and a "Linked Print" button 153 operated to give an instruction for batch-executing multiple print jobs.

In the job lists 151, the print jobs held in each image forming device 10 are displayed as a list using the names of the documents to be handled. In this example, the job lists 151 include a list 151a listing print jobs for the documents "Report A", "Report", and "Invoice" held in the image forming device 10a ("Printer A"), a list 151b listing print jobs for the documents "Report B", "Approval Document", and "Investigation" held in the image forming device 10b ("Printer B"), and a list 151c listing print jobs for the documents "Statement A", "Statement B", and "Report C" held in the image forming device 10c ("Printer C").

Also, in the present exemplary embodiment, the job lists 151 function as buttons for receiving the selection of each listed print job. For example, "Report A" in the job lists 151 functions as a button for receiving the selection of the print job for handling the document "Report A" held in the image forming device 10a.

The "Preview" button 152 receives an instruction for displaying an image (hereinafter referred to as a "preview image") illustrating the content of the document to be handled by the selected print job. More specifically, if the "Preview" button 152 is pressed while a print job is selected from the job lists 151, the display changes to the screen 160 illustrated in FIG. 6B. The screen 160 is provided with a preview image 161 corresponding to the document to be handled by the selected print job, a "Print" button 162 operated to give an instruction for executing the selected print job, an "Edit" button 163 operated to give an instruction for displaying a screen (described later using FIGS. 7A to 7C) for receiving a correction with respect to the selected print job, and a "Back" button 164 operated to give an instruction for changing the display to the screen 150.

By looking at the displayed preview image 161, the user is able to check the content of the document to be handled by the selected print job.

Note that if a print job held in another image forming device 10 is selected and the "Preview" button 152 is pressed, the print job or the data file of the document to be handled is acquired from the management server 20 or the other image forming device 10, and the preview image 161 is displayed. For example, if the document "Report B" held in the image forming device 10b is selected and the "Preview" button 152 is pressed on the image forming device 10a, the image forming device 10a requests and acquires the print job or the data file of the document "Report B" from the management server 20 or the image forming device 10b.

When executing a print job, the user selects one or more print jobs and gives an instruction for executing the print job(s). For example, if the three print jobs A, B, and C for handling the documents "Report A", "Report B", and "Report C" are selected from the job lists 151 on the screen 150 and the "Linked Print" button 153 is pressed, an instruction is given for executing the print job A on the image forming device 10a, executing the print job B on the image forming device 10b, and executing the print job C on the image forming device 10c. Each image forming device 10 begins executing the print job indicated by the instruction if there are no other print jobs in progress. If another print job in progress exists, the image forming device 10 begins executing the print job indicated by the instruction after the completion of the print job in progress.

As another example, if the user selects the print job A for handling the document "Report A" from the job lists 151 on the screen 150 and presses the "Preview" button 152, the screen 160 including the preview image 161 of the document "Report A" is displayed. Thereafter, an instruction for executing the print job A is given by pressing the "Print" button 162.

At this point, in some cases, the user may check the outputted document while the print job is in progress and spot an error regarding the content of the document or the appearance of the paper document. Alternatively, in some cases, the user may check the preview image 161 and spot an error before the print job is executed.

As an example, assume that the user notices that the character string "Search company A" underlined in the preview image 161 illustrated in FIG. 7A is incorrect. The user presses the "Edit" button 163 to give an instruction for displaying a screen 170 for editing the document illustrated in FIG. 7B. In this example, the screen 170 is provided with an editing image 171 which is an image illustrating the content of the document and which is for receiving edits based on input from the user, a keyboard 172 that receives editing-related input from the user, a scroll bar 173 enabling the user to perform a scroll operation for changing the location displayed in the editing image 171, and a "Finish" button 174 operated to give an instruction for correcting the document.

The user uses the keyboard 172 to perform operations for deleting the incorrect character string "Search company A" and inserting the correct character string "Search company B". The deletion and insertion of character strings is reflected in the editing image 171, and the portion "Search company A" underlined in FIG. 7A is replaced by "Search company B" underlined in FIG. 7B.

When the user is done correcting the error, the user presses the "Finish" button 174. When the "Finish" button 174 is pressed, correction of the corresponding document is executed according to the content of the editing received by the editing image 171. With this arrangement, in the data file of the corresponding document, the character string "Search company A" of the corresponding portion is corrected to the character string "Search company B". In other words, the data file of the document included in the print job is corrected, and the print job is corrected as a print job for handling the corrected document.

In the present exemplary embodiment, when the "Finish" button 174 is pressed and the correction of the print job is completed, the display changes to the screen 160 and a preview image 161 illustrating the content of the corrected document is displayed, as illustrated in FIG. 7C.

Note that although the above describes the case of correcting an error contained in a document, the content of the correction is not limited. For example, altering the appearance, such as the color or size, of a character string in a document and replacing an image in a document with a different image may also be performed as corrections. As another example, changing a print setting may also be performed as a correction. FIG. 7B illustrates an example of a case where the keyboard 172 is provided to receive a revision, but any of various types of instruction parts for giving instructions according to the content of a received correction, such as altering the appearance of a character string, replacing an image, or changing a print setting, may be provided.

When a revision is received on the screen 170, character strings thought to contain a similar error in the document may also be extracted and presented to the user. More specifically, if a character string that is the same as the uncorrected character string exists in a different location from the location where a correction by the user is received, the character string may be presented to the user. For example, in FIG. 7B, the character string "Search company A" is also included on the first line of the document, that is, a location different from the location where the correction is received (the underlined string). In this case, the user may be notified with text such as "'Search company A' exists in another part of the document.", for example. As another example, a process such as emphasizing the display of a character string extracted from a different location may be performed.

Furthermore, if a character string that is the same as the uncorrected character string exists in a different location from the location where the correction is received, the user may be queried as to whether to make a similar correction in the different location. If the user gives an instruction for making a similar correction, a similar correction may be performed in the different location. For example, in the example in FIG. 7B, an instruction for replacing all instances of "Search company A" with "Search company B" inside the document "Report A" may be received.

Also, in the above example, if the "Edit" button 163 is pressed for a print job that is in progress or designated for execution by an instruction, the execution of the print job is stopped or deferred. Otherwise, an instruction part operated to give an instruction for stopping or deferring the execution of a print job may be provided on the screens 150, 160, and 170 or as a hardware key, and the "Edit" button 163 may be pressed after stopping or deferring execution of the print job.

Returning to FIG. 5, the steps from S508 will be referenced to describe an example in which a correction is made with respect to the print job A of the document "Report A". At this point, it is assumed that an instruction is given for executing the three print jobs A, B, and C for handling the documents "Report A", "Report B", and "Report C", after which a correction is made to the print job A.

The image forming device 10a receives the correction with respect to the print job A of the document "Report A" (S508). As described above, in the present exemplary embodiment, the execution of the print job A is stopped or deferred in response to the reception of the correction.

Next, the image forming device 10a identifies related jobs that are related to the print job A for which the correction is received (S509). In the present exemplary embodiment, related jobs are identified as print jobs which were registered by the same user and which contain a shared character string in the names of the documents. In this case, the print job B of the document "Report B" held in the image forming device 10b and the print job C of the "Report C" held in the image forming device 10c are identified as related jobs.

Note that when related jobs are identified, information indicating the identified related jobs may also be displayed on the image forming device 10a. For example, as illustrated in FIG. 6A, the job lists 151 may be displayed with the print job A to be corrected and the related print jobs B and C being emphasized (displayed as being shaded in the diagram) to indicate which print jobs have been identified as related jobs.

Thereafter, the image forming device 10a issues an instruction to stop or defer the related jobs to the image forming devices 10b and 10c holding the identified related jobs (S510). The image forming devices 10b and 10c receiving the instruction stop or defer the execution of the print jobs B and C (S511). Note that in this example, since the correction to the print job A is received after the instruction for executing the print jobs A, B, and C is given, the process for stopping or deferring the execution of the print jobs A, B, and C is performed. If the correction to the print job A is received before the instruction for executing the print jobs A, B, and C is given, the process for stopping or deferring the print jobs is unnecessary.

The image forming device 10a executes the correction on the print job A (S512). At this time, the notification creation unit 115 of the image forming device 10a may create a notification indicating that the print job A has been corrected, and transmit the created notification to the terminal device 30 of the user.

In addition, the notification creation unit 115 creates correction information for applying the effect of the correction to the print job A, and transmits the created correction information to the image forming devices 10b and 10c holding the related jobs (S512). Note that the correction information may also be transmitted to the management server 20 to be managed as a history. The correction information may also be transmitted to the terminal device 30 of the user who registered the print jobs A, B, and C, and in this case, the user may be notified that the print job A has been corrected.

The image forming devices 10b and 10c, in response to the received correction information, apply the effect of the correction to the print jobs B and C held in the devices themselves (S514). For example, in accordance with the correction of an error in the document "Report A", the image forming devices 10b and 10c receive correction information including information about the incorrect character string and the correct character string and similarly correct the error in the documents "Report B" and "Report C". As another example, in accordance with the correction of a print setting in the print job A, the image forming devices 10b and 10c receive correction information including the content of the corrected print setting and similarly change the print setting in the print jobs B and C. In this case, the image forming device 10a may also be notified that the effect of the correction has been applied.

Note that at any point until the operation in S514 is executed, the image forming device 10a may also receive an instruction from the user regarding whether the effect of the correction is to be applied. If an instruction for applying the effect of the correction is given, the operations from S514 may be executed, whereas if an instruction for not applying the effect of the correction is given, only the print job A may be corrected and the effect of the correction may not be applied to the print jobs B and C.

Note that after S514, that is, after the effect of the correction is applied by the image forming devices 10b and 10c, if the user selects "Report B" or "Report C" from the job lists 151 on the screen 150 (see FIG. 6A) and presses the "Preview" button 152, an instruction may be given for displaying a preview image 161 corresponding to the document "Report B" or "Report C" with the effect of the correction applied thereto. In this way, by displaying the preview image 161 corresponding to a document with the effect of the correction applied thereto in accordance with a user request, the effect of the correction to be applied is grasped by the user. Also, if the effect of the correction is applied by the image forming devices 10b and 10c, a corresponding preview image 161 may be displayed irrespectively of a user instruction to enable the user to grasp the effect of the correction.

Thereafter, the image forming devices 10a, 10b, and 10c resume the stopped or deferred print jobs A, B, and C (S515). Alternatively, if the print job A is corrected and the effect of the correction is applied to the print jobs B and C before an instruction for executing the print jobs A, B, and C is given, the execution of the print jobs A, B, and C is started after an execution instruction is received from the user.

Note that if a print job is stopped and corrected or has the effect of a correction applied thereto while the print job is in progress, that is, after at least a portion of the paper document is outputted, the print job may also be restarted from the beginning rather than being resumed. In other words, when the user gives an instruction for printing, a number of copies designated in advance as the number of copies to print may be printed. For example, in the case where the print job A is a process for printing 10 copies of the document "Report A" and the print job A is corrected after five copies are printed, if the print job is resumed and the remaining five copies are printed, the output will be five copies of the uncorrected paper document and five copies of the corrected paper document. In contrast, if the print job is restarted from the beginning, the output will be 10 copies of the corrected paper document, and the number of copies designated in advance by the user are obtained.

Moreover, if a print job is stopped and corrected or has the effect of a correction applied thereto while the print job is in progress, that is, after at least a portion of the paper document is outputted, the pages of the document that are corrected or have the effect of a correction applied thereto may be reprinted. In the case where the print job A is a process for printing 10 copies of the document "Report A" containing three pages and only the second page is corrected after five copies are printed, five copies of the corrected second page may simply be printed to replace the five copies already printed. Meanwhile, the remaining five copies may simply be printed as paper documents containing the corrected second page.

In the present exemplary embodiment, through the operations in S501 to S515, the effect of the correction made to the print job A on the image forming device 10a is applied to the print jobs B and C held in the image forming devices 10b and 10c. This arrangement reduces the user burden compared to the case where the user has to operate the image forming devices 10b and 10c individually to correct the print jobs B and C or the case where the user has to re-register the corrected print jobs B and C on the terminal device 30.

FIG. 5 is used to describe an example of a case where the image forming device 10a is responsible for the print job A of the document "Report A" while the image forming devices 10b and 10c are responsible for the print jobs B and C of the documents "Report B" and "Report C" different from the document "Report A".

In some cases, a certain document may be divided into multiple portions and multiple image forming devices 10 may be responsible for printing the documents corresponding to each of the portions, for the purpose of shortening the time taken for printing and the like. Hereinafter, the undivided document will be referred to as the original document, and the documents corresponding to each of the portions will be referred to as the split documents. In other words, if all of the split documents are merged, the original document is obtained. For example, in the case of wanting to print an original document D containing 100 pages, it is conceivable to divide the original document D into a split document D1 corresponding to pages 1-33, a split document D2 corresponding to pages 34-66, and a split document D3 corresponding to pages 67-100, and print 100 copies each of the split documents D1, D2, and D3.

For example, in some cases, the original document may be divided into the split documents D1, D2, and D3 on the terminal device 30 and respectively distributed to each image forming device 10 as different print jobs D1, D2, and D3. In this case, for example, the original document is divided by having the user using the terminal device 30 to edit and break up the original document to generate the split documents D1, D2, and D3, or by having the terminal device 30 break up the original document at intervals of a predetermined number of pages to generate the split documents D1, D2, and D3.

As another example, if a print job D of the original document D is transmitted to the management server 20, the management server 20 may break up the original document D at intervals of a predetermined number of pages to generate the split documents D1, D2, and D3, and generate print jobs D1, D2, and D3 for handling each of the split documents. Thereafter, the print jobs D1, D2, and D3 may be transmitted and distributed to each image forming device 10. At this time, the information that was included in the print job D of the original document D is used for the user information and print settings to be included in the print jobs D1, D2, and D3.

Note that the management server 20 may also determine the destinations of the print jobs D1, D2, and D3 according to factors such as the number of print jobs held in each image forming device 10, the content of the held print jobs, and the processing power of each image forming device 10.

As yet another example, if the print job D of the original document D is registered in an image forming device 10, the image forming device 10 may break up the original document D at intervals of a predetermined number of pages to generate the split documents D1, D2, and D3, and generate the print jobs D1, D2, and D3 for handling each of the split documents. Thereafter, some or all of the print jobs D1, D2, and D3 may be transmitted and distributed to other image forming devices 10. In this case, too, the information that was included in the print job D of the original document D is used for the user information and print settings to be included in the print jobs D1, D2, and D3.

Note that the determination of whether the image forming device 10 or the management server 20 breaks up the original document may be made according to the number of pages in the original document, the number of copies to be printed, and the number of printed sheets, that is, the product of the number of pages multiplied by the number of copies to be printed. For example, split documents may be generated and corresponding print jobs may be generated if the number of pages in the original document, the number of copies to be printed, or the number of printed sheets exceeds a predetermined threshold value.

Also, when the image forming device 10, the management server 20, or the terminal device 30 breaks up the original document, each split document may be given a name containing a shared character string such that the print jobs for the split documents are identified as related jobs. For example, the names "Report_202202181920_1", "Report_202202181920_2", and "Report_202202181920_3" of split documents obtained by dividing an original document "Report" into three parts contain character strings corresponding to the name of the original document, the date and time (Feb. 18, 2022 19:20) of the division, and the numbers of the split documents (the suffixes 1, 2, and 3). In this case, the name of each split document includes the shared character string "Report_202202181920". Note that the "numbers of the split documents" are numbers indicating the order of the split documents when the split documents are arranged to correspond with the original document. The numbers of the split documents may be included in the names of the documents and also in the print jobs.

When the original document is divided in the image forming device 10 or the management server 20 and distributed to multiple image forming devices 10 for printing, the user who gave the instruction for printing the original document may be notified of the division. For example, the user may be notified on the terminal device 30 that the document will be divided and printed by the image forming devices 10.

FIG. 8 is a diagram illustrating an example of a notification to the terminal device 30 when the original document is split. FIG. 8 illustrates an example of a case where a document to be handled by a print job (JOB-ID XXX) transmitted to the image forming device 10a is treated as the original document, three split documents are generated by the image forming device 10a, and print jobs for each of the split documents are distributed among the image forming devices 10a, 10b, and 10c. On a display 35 of the terminal device 30, a screen 350 is provided with an icon 351 indicating that there is a printing-related notification and a message 352 indicating that the document is to be divided and distributed among the image forming devices 10a, 10b, 10c (designated the printers A, B, and C in the diagram) for printing. By checking the message 352, the user is able to grasp that the printing of the original document (JOB-ID XXX) indicated in an instruction from the user is to be distributed among the image forming devices 10a, 10b, and 10c.

Note that in the display example in FIG. 8, an "Execute Printing" button 353 operated to give an instruction for executing the print jobs for each of the split documents and a "Cancel Printing" button 354 operated to give an instruction for canceling the print jobs for each of the split documents are also displayed. The user may give the instruction for executing the print jobs for each of the split documents from the image forming device 10, but may also give the execution instruction by using the "Execute Printing" button 353.

Also, if an instruction for printing two or more copies of a certain document is given, the printing may be distributed among multiple image forming devices 10 in some cases. For example, in the case of wanting to print 100 copies of a document E, the printing may be distributed such that the image forming device 10a prints 33 copies, the image forming device 10b prints 33 copies, and the image forming device 10c prints 34 copies. That is, in some cases, it may be desirable to divide the process for printing 100 copies of the document E into the three print jobs of a print job E1 for printing 33 copies of the document E, a print job E2 for printing 33 copies of the document E, and a print job E3 for printing 34 copies of the document E, and cause the print jobs to be executed by the image forming devices 10a, 10b, and 10c, respectively. In this way, when breaking up an original, shared print job into multiple print jobs (also referred to as "split jobs" in some cases) at intervals of the number of copies to be printed, the print job may simply be divided by the image forming device 10, the management server 20, or the terminal device 30 and the print jobs after the division may be respectively handled by image forming devices 10, similarly to the case of dividing a document described above.

Incidentally, if an error in a document is corrected and the number of characters before the correction is different from the number of characters after the revision, the layout of the document may not be preserved in some cases.

Figure 9A:
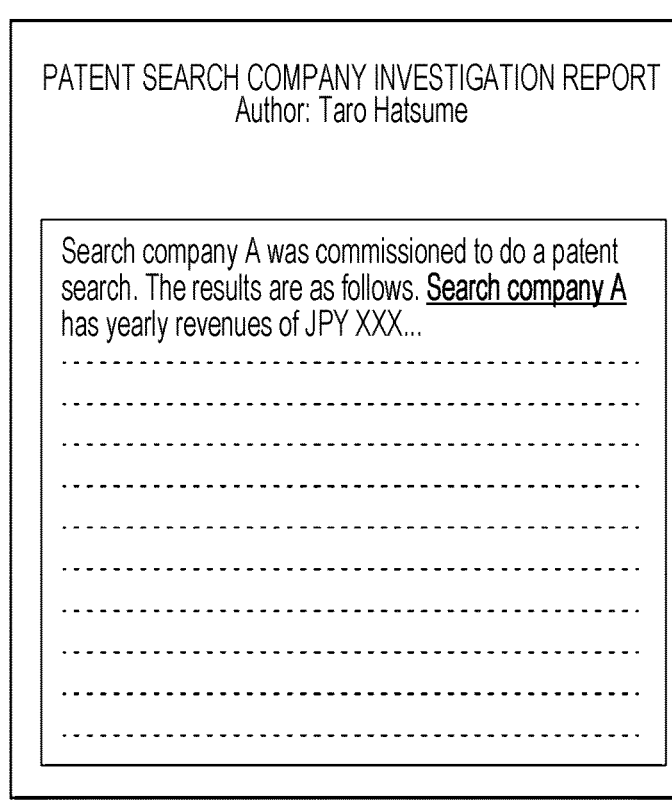
Figure 9B:
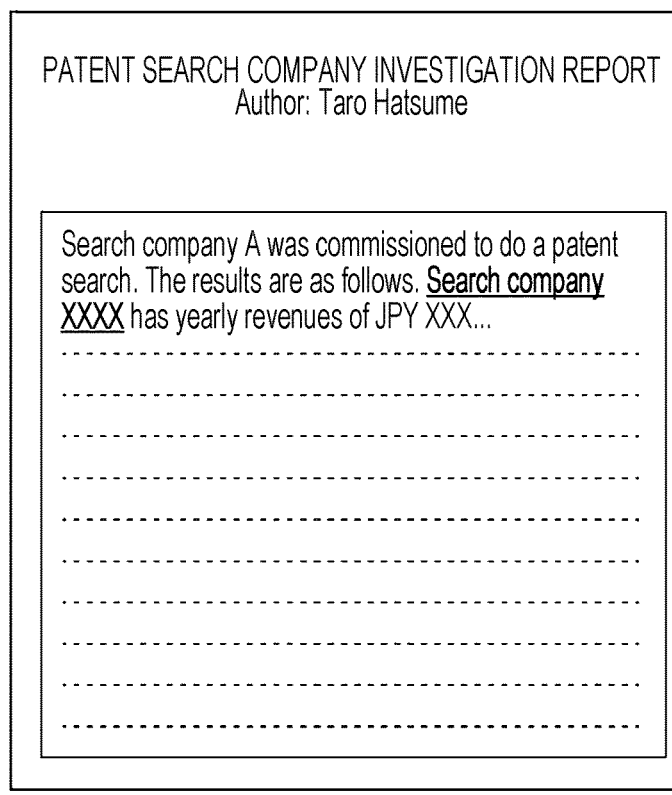

FIGS. 9A and 9B are diagrams for explaining a layout change in a case where a certain character string is corrected to a character string containing a different number of characters, in which FIG. 9A illustrates a preview image 161 corresponding to a document before the character string is corrected and FIG. 9B illustrates a preview image 161 corresponding to the document after the character string is corrected to a character string containing a different number of characters.

FIG. 10 is a diagram illustrating an example of a notification to the user in the case where a certain character string is corrected to a character string containing a different number of characters.

If a revision does not cause the character count to change, such as in the case where the uncorrected character string "Search company A" contains 16 characters and the corrected character string "Search company B" also contains 16 characters, for example, the correction may not cause the layout to change, as illustrated in FIGS. 7A and 7C, and the layout of the document as created by the user may be preserved.

However, if a revision causes the character count to increase, such as in the case where the uncorrected character string "Search company A" contains 16 characters but the corrected character string "Search company XXXX" contains 19 characters, for example, the character string may flow over into the next row as illustrated in FIG. 9A, the number of rows may increase, and the layout may not be preserved. Moreover, the increase in the number of rows may cause a character string may flow over onto the next page, and the layout may not be preserved. Conversely, in the case where a revision causes the character count to decrease, the layout likewise may not be preserved due to a decrease in the number of rows.

Consequently, in the present exemplary embodiment, if a correction is received in which the corrected character string contains a different number of characters than the uncorrected character string, the image forming device 10 notifies the user that the character count is different. As a more specific example, a message 180 is displayed to notify the user, as illustrated in FIG. 10. In this example, the message 180 includes the text "The correction has caused the character count to change." indicating that the character count is different due to the correction, the text "the layout may not be preserved." referring to the possible change of layout, and the text "Do you want to execute the correction?" to query the user about whether to execute the correction.

In addition, an "Execute Correction" button 181 operated to give an instruction for executing the correction and a "Cancel Correction" button 182 operated to give an instruction for canceling the correction are displayed together with the message 180 on the screen 160. By checking the message 180, the user understands that the layout may not be preserved, and presses the "Execute Correction" button 181 if the user still wants to make the correction or presses the "Cancel Correction" button 182 if the user does not want to make the correction. This arrangement avoids layout changes not intended by the user with regard to a corrected document.

Moreover, the layout of a related job held in another image forming device 10 similarly may not be preserved when performing similar error correction according to correction information. The image forming device 10 may additionally notify the user that the layout may also not be preserved in a related job held in another image forming device 10. The user is able to decide whether to execute correction with consideration for whether the layout will be preserved in the related job.

Furthermore, if the printing of split documents is distributed among multiple image forming devices 10 and the layout is not preserved in one of the split documents, in some cases, the layout of the document as a whole may not be preserved when the paper documents outputted from each of the image forming devices 10 are assembled to form a paper document corresponding to the original document. For example, assumed that for the split documents D1, D2, and D3 described above, an increase in the number of rows occurs in the split documents D1, D2, and D3, and pages containing only the character string of a single row are added as the last pages. If the paper documents of the split documents D1, D2, and D3 are assembled to form a paper document of the original document D, a page containing only the character string of a single row will exist between the portion corresponding to the split document D1 and the portion corresponding to the split document D2 and also between the portion corresponding to the split document D2 and the portion corresponding to the split document D3, and the layout of the paper document will not be preserved.

Consequently, in the present exemplary embodiment, when a correction that causes the character count to be different is received for split documents, the image forming device 10 notifies the user about the possibility that the overall layout of the assembled paper document may not be preserved.

Exemplary Applications and Exemplary Modifications (Identifying Related Job)

In the present exemplary embodiment, a related document is determined and a related job is identified on the predetermined condition that "the print job was registered by the same user" and "the names of the documents contain a shared character string".

As described above, the predetermined condition to be used to determine related documents is not limited, and may also be the condition that the documents are "split documents obtained by dividing a shared original document". In this case, information for identifying the original document is included in print jobs for the split documents. For example, the name of the original document or the like may be used as the information for identifying the original document.

Also, in the present exemplary embodiment, "the names of the documents contain a shared character string" is set as a condition, but a condition stipulating that a shared character string or a shared image is included in the content of the documents may also be set as a condition. Note that "a shared character string or a shared image is included in the content of the documents" is an example of including shared matter.

In this case, the image forming device 10 acquires information including the data file of a document to be handled by a print job held in another image forming device 10 as the other device job information, for example.

Note that split jobs based on a shared print job handle the same document as one another, and a shared character string or a shared image is included. Consequently, the image forming device 10 determines that, with respect to a document to be handled by a certain split job, a document to be handled by another split job based on a shared print job is a related document. In this case, information for identifying the original print job is included in the split jobs. For example, a job ID or the like of the original print job may be used as the information for identifying the original print job.

Furthermore, in another exemplary embodiment, "the print job was registered by the same user" may not be set as a condition, a print job registered by another user may be identified as a related job, and the effect of a correction may be applied thereto. Note that in the case of applying the effect of a correction to a print job registered by another user, a notification may be transmitted to the terminal device 30 of the other user.

Furthermore, instead of "the print job was registered by the same user", a condition stipulating that the user who registered the print job has the same user attributes may be set. For example, the user attributes includes an organization to which the user belongs, a rank within the organization, or the like.

The image forming device 10 according to the present exemplary embodiment uses two conditions to determine that documents are related, but in another exemplary embodiment, the determination may be made using only one condition, or the determination may be made using three or more conditions. In other words, there is no limit on the number of predetermined conditions indicating that documents are related.

Also, in the example of operations illustrated in FIG. 5, the image forming device 10a is described as acquiring other device job information and identifying related jobs of the print job A after receiving a correction to the print job A. The acquiring of other device job information and the identifying of related jobs may also be performed at a different time, at least before the correction information is transmitted. For example, the acquiring of other device job information and the identifying of related jobs may be performed when the print job A is registered in the image forming device 10a.

Furthermore, a configuration is also possible in which the identifying of related jobs is performed by the management server 20, and information indicating the identified related jobs is transmitted to the image forming device 10a.

(Correction Information)

The present exemplary embodiment describes a case where the image forming device 10 transmits information about uncorrected and corrected character strings, the content of a changed print setting, and the like as the correction information. In the case where a print job held in another image forming device 10 or the data file of a document to be handled is acquired as the other device job information, the content of the other device job information may be modified as transmitted as the correction information. For example, in the case where the image forming device 10a holds the print job A for the document "Report A", the image forming device 10b holds the print job B for the document "Report B", and the image forming device 10c holds the print job C for the document "Report C", the image forming device 10a acquires the print jobs B and C as other device job information. Thereafter, the image forming device 10a may modify the print jobs B and C in way similar to a correction made to the print job A, and transmit the modified print jobs B and C to the image forming devices 10b and 10c. The image forming devices 10b and 10c may replace the originally held print jobs B and C with the modified print jobs B and C received as correction information and apply the effect of the correction.

(Applying Effect)

With regard to a print job corrected on a certain image forming device 10 and a related job held in another image forming device 10, a condition depending on an attribute of the documents to be handled by related jobs may be set, such that correction information is transmitted if the condition is fulfilled and not transmitted if the condition is not fulfilled.

For example, with respect to a document to be handled by a print job corrected on an image forming device 10, a condition stipulating that the document to be handled by a related job is a downstream document or an upstream document may be set as the condition for transmitting correction information to an image forming device 10 holding a related job. Here, a "downstream document" refers to a document that comes after a certain document when the documents are arranged in order. Conversely, an "upstream document" refers to a document that comes before a certain document when the documents are arranged in order. For example, in the case where documents exist in a trilogy, the first document is an upstream document with respect to the middle document, and the last volume is a downstream document with respect to the middle document. Similarly, in the case where documents "No. 1", "No. 2", and "No. 3" exist, No. 1 is an upstream document with respect to No. 2, and No. 3 is a downstream document with respect to No. 2.

In this way, the image forming device 10 may infer an order of documents from the names of documents to be handled by related jobs, determine whether to transmit correction information, and apply the effect of a correction only to a print job for handling a downstream or an upstream document.

Note that the order of split documents may be inferred according to numbers of the split documents included in the names or the print jobs of the split documents.

(Image Forming Device 10 that Applies Effect of Correction)

In the present exemplary embodiment described above, the effect of a correction to the print job A made on the image forming device 10a is applied to the print jobs B and C by the image forming devices 10b and 10c, and the print jobs B and C are corrected.

This case may be considered to be a case where the image forming devices 10b and 10c correct a print job if information for correcting a print job held in each device itself is received from the image forming device 10a holding a print job related to the print job held in each device itself.

(Image Forming Device 10 Operated by User)

When giving an instruction for printing a document on the terminal device 30, the user may also designate in advance the image forming device 10 that the user will operate. For example, print jobs A, B, and C are registered and the image forming device 10a is designated as the device to be operated, the image forming device 10a may identify related jobs of the print job A at a time before the user is identified.

Presenting Information

In the present exemplary embodiment described above, various information such as notifications issued by each device is described as being presented to the user by displaying the information on a display, but the means of presenting information is not limited. For example, any of various known means of presenting information, such as email or speech-based notification, may also be used.

(Method for Correcting Document)

The present exemplary embodiment described above may also be understood as a method for correcting a document using the image forming device 10. More specifically, the present exemplary embodiment may be considered to be a method for correcting a document, the method including: receiving a correction from a user regarding the print job A handled by the image forming device 10a; transmitting correction information to the image forming devices 10b and 10c if a predetermined condition is fulfilled, the predetermined condition indicating that the documents "Report B" and "Report C" to be handled by the print jobs B and C handled by the image forming devices 10b and 10c are related to the document "Report A" to be handled by the print job A; and applying the effect of the correction to the print jobs B and C on the basis of the correction information.

In the exemplary embodiment, exemplary applications, and exemplary modifications described above, a program to be executed by the CPU 11a (see FIG. 2) or 21a (see FIG. 4) as an example of a processor is provided to the computational processing unit 11 or 21 in a recorded state on a computer-readable recording medium, such as a magnetic recording medium (magnetic tape, a magnetic disk, or the like), an optical recording medium (an optical disc or the like), a magneto-optical recording medium, or semiconductor memory. Moreover, the program to be executed by the CPU 11a or 21a may be downloaded to the image forming device 10, the terminal device 30, or the management server 20 by using a means of communication such as the Internet. In the exemplary embodiment, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device). In the exemplary embodiment, the term "processor" is broad enough to encompass one processor or plural processors in collaboration which are located physically apart from each other but may work cooperatively. The order of operations of the processor is not limited to one described in the exemplary embodiment, and may be changed.

The processes to be performed by the information processing system in the exemplary embodiment are prepared as a program such as application software, for example. The program obviously may be provided via a communication medium, and may also be provided by being stored on a recording medium such as CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

A method for correcting a document, the method comprising:

receiving a correction from a user with respect to a process of printing a first document to be handled by a first image forming device;

transmitting correction information in a case where a predetermined condition is fulfilled, the predetermined condition indicating that a second document of which printing is to be handled by a second image forming device is related to the first document, and the correction information causing the second image forming device to apply an effect of the correction to a process of printing the second document; and applying, on a basis of the correction information, the effect of the correction to the process of printing the second document.

What is claimed is:

1. An image forming device comprising:
a processor configured to:
receive a correction from a user with respect to a process of printing a first document to be handled by the image forming device; and
transmit correction information in a case where a predetermined condition is fulfilled, the predetermined condition indicating that a second document of which printing is to be handled by another image forming device is related to the first document, and the correction information causing the other image forming device to apply an effect of the correction to a process of printing the second document, wherein
the same effect of the correction is applied to the process of printing the first document and the process of printing the second document.

2. The image forming device according to claim 1, wherein the predetermined condition stipulates that the second document and the first document include shared matter.

3. The image forming device according to claim 2, wherein the processor is configured to:
receive the correction that replaces at least a portion of the shared matter included in the first document with other matter; and
transmit information for replacing the shared matter included in the second document with the other matter as the correction information.

4. The image forming device according to claim 2, wherein
the first document and the second document include a shared character string as the shared matter, and
in a case of receiving the correction that replaces the shared character string included in the first document with another character string containing a different number of characters than the shared character string, the processor is configured to notify the user that a character count is different.

5. The image forming device according to claim 1, wherein the predetermined condition stipulates that the first document and the second document are each a portion obtained by dividing a shared original document into a plurality of portions.

6. The image forming device according to claim 5, wherein the processor is configured to not transmit the correction information in a case where the second document is a portion that comes before the first document in the original document.

7. The image forming device according to claim 1, wherein the processor is configured to:

receive, as the correction, an indication causing printed material outputted by printing the first document to be outputted in a different way; and
transmit, as the correction information, information causing printed material outputted by printing the second document to be outputted in the different way.

8. The image forming device according to claim 1, wherein the processor is configured to display an image on a display upon request from the user, the image illustrating content of the second document with the effect of the correction applied.

9. An image forming device comprising:
a processor configured to:
receive an instruction regarding a process of printing a second document; and
make a correction related to the process of printing the second document upon receiving information from another image forming device regarding a correction requested regarding a process of printing a first document, the information causing the image forming device to make the correction related to the process of printing the second document, wherein
a same effect of the correction is applied to the process of printing the first document and the process of printing the second document.

10. A non-transitory computer readable medium storing a program causing a computer to execute a process comprising:
receiving a correction from a user with respect to a process of printing a first document to be handled by an image forming; and
transmitting correction information in a case where a predetermined condition is fulfilled, the predetermined condition indicating that a second document of which printing is to be handled by another image forming device is related to the first document, and the correction information causing the other image forming device to apply an effect of the correction to a process of printing the second document, wherein
the same effect of the correction is applied to the process of printing the first document and the process of printing the second document.

11. An image forming device comprising:
a processor configured to:
receive a correction from a user with respect to a process of printing a first document to be handled by the image forming device; and
transmit correction information in a case where a predetermined condition is fulfilled, the predetermined condition indicating that a second document of which printing is to be handled by another image forming device is related to the first document, and the correction information causing the other image forming device to apply an effect of the correction to a process of printing the second document, wherein
the predetermined condition stipulates that the second document and the first document include shared matter, and
the processor is further configured to:
receive the correction that replaces at least a portion of the shared matter included in the first document with other matter; and
transmit information for replacing the shared matter included in the second document with the other matter as the correction information.

* * * * *